United States Patent
Sarwar et al.

(10) Patent No.: US 8,520,514 B2
(45) Date of Patent: Aug. 27, 2013

(54) SYSTEM AND METHOD FOR CONFIGURATION ADMISSION CONTROL OF SERVICE INSTANCES

(75) Inventors: Muhammad Sakhi Sarwar, Brookfield, CT (US); Zigmunds Andis Putnins, Ridgewood, NJ (US); Jaya Sarup, Monroe, NY (US); Zanjun Lu, Edison, NJ (US)

(73) Assignee: Fujitsu Limited, Kawasaki-shi (JP)

( * ) Notice: Subject to any disclaimer, the term of this patent is extended or adjusted under 35 U.S.C. 154(b) by 138 days.

(21) Appl. No.: 13/175,359

(22) Filed: Jul. 1, 2011

(65) Prior Publication Data
US 2013/0003539 A1      Jan. 3, 2013

(51) Int. Cl.
*H04L 12/26* (2006.01)
(52) U.S. Cl.
USPC .......................................... 370/230
(58) Field of Classification Search
None
See application file for complete search history.

(56) References Cited

U.S. PATENT DOCUMENTS

2011/0154352 A1*   6/2011   Desota et al. .................. 718/104

* cited by examiner

*Primary Examiner* — Minh-Trang Nguyen
(74) *Attorney, Agent, or Firm* — Baker Botts L.L.P.

(57) ABSTRACT

A method for configuring admission control of service instances in a network element may include: (i) reading a pre-determined maximum service-idle utilization of a processor approximately equal to maximum utilization of the processor in the absence of services executing on the processor; (ii) reading, for each particular service instance of a desired configuration of service instances, a pre-determined maximum utilization of the processor associated with the particular service instance; (iii) calculating an aggregate maximum utilization for the desired configuration, based on the pre-determined maximum service-idle utilization and the pre-determined maximum utilizations for each of the particular service instances; (iv) determining whether the aggregate maximum utilization is greater than a threshold maximum utilization for the processor; (v) allowing or denying the desired configuration based on the determination.

18 Claims, 3 Drawing Sheets

SYSTEM AND METHOD FOR CONFIGURATION ADMISSION CONTROL OF SERVICE INSTANCES

TECHNICAL FIELD OF THE INVENTION

The present invention relates generally to networking and computing systems and, more particularly, to a method and system for processor-level admission control of service instances.

BACKGROUND

Telecommunications systems, cable televisions systems, and data communication networks use communication networks to rapidly convey large amounts of information between remote points. A communication network may include network elements that route packets through the network. Some network elements may include a distributed architecture, wherein packet processing may be distributed among several subsystems of the network element (e.g., line cards).

A network element may be configured to execute instances of one or more services. Broadly defined, a service may include a subsystem of a network element configured to carry out a defined functionality or task of the network element. In some embodiments, a service may be embodied in a program of instructions embodied in computer readable media and configured to, when read and executed by a processor, cause the processor to execute the functionality or task of the service. Examples of services may include Service Operation, Administration, and Management (SOAM) Continuity Check Messaging (CCM), SOAM path monitoring (e.g., including delay measurement and fault monitoring), Ethernet Virtual Connection (EVC) path monitoring, Link Capacity Adjustment Scheme (LCAS), and/or Management Virtual Local Area Network (MVLAN).

Because services executing on a network element consume processing resources, a processor may be limited in the number of services it may simultaneously execute. In certain cases, a network administrator may instantiate numerous instances of various services for simultaneous execution on a network element. Initially, the services may not exceed the processing resources upon instantiation, but may later exhaust the resources when a plurality of the services simultaneously require processing resources in order to carry out their specific functions, which may lead to performance degradation. Disadvantageously, only upon exhausting resources may a network administrator learn that a particular configuration of services exceeds processing resources, through observation of degraded operation.

SUMMARY

In accordance with the present invention, disadvantages and problems associated with traditional approaches of instantiating services may be reduced or eliminated.

In accordance with embodiments of the present disclosure, a method for configuring admission control of service instances in a network element may include: (i) reading a pre-determined maximum service-idle utilization of a processor approximately equal to maximum utilization of the processor in the absence of services executing on the processor; (ii) reading, for each particular service instance of a desired configuration of service instances, a pre-determined maximum utilization of the processor associated with the particular service instance; (iii) calculating an aggregate maximum utilization for the desired configuration, based on the pre-determined maximum service-idle utilization and the pre-determined maximum utilizations for each of the particular service instances; (iv) determining whether the aggregate maximum utilization is greater than a threshold maximum utilization for the processor; (v) allowing the desired configuration if the aggregate maximum utilization is not greater than the threshold maximum utilization for the processor; and (vi) denying the desired configuration if the aggregate maximum utilization is greater than the threshold maximum utilization for the processor.

Certain embodiments of the invention may provide one or more technical advantages. For example, methods and systems disclosed herein may allow for maximizing the number of service instances for a given network element, and allow for determining processor utilization for a configuration of services prior to applying the configuration. In addition, methods and systems disclosed herein may allow for a given network element to have a larger number of any one service instance running, rather than pre-determining for the given network a maximum number of each service instance that may be run simultaneously as is often done in the traditional approaches.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Embodiments of the present invention and its advantages are best understood by referring to FIGS. 1-4, like numerals being used for like and corresponding parts of the various drawings.

Figure 1:
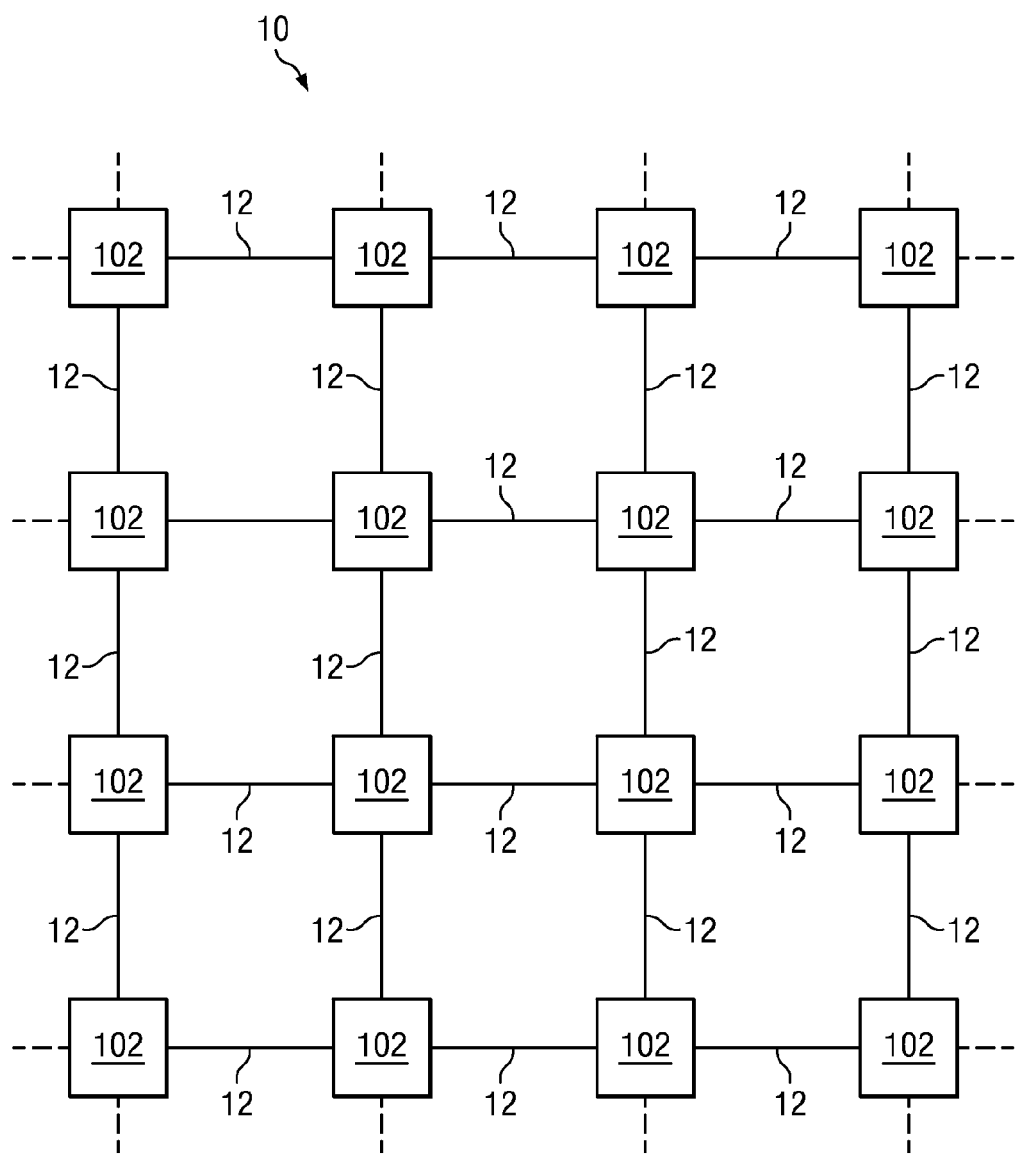
FIG. 1 illustrates a block diagram of an example network, in accordance with embodiments of the present disclosure.

FIG. 1 illustrates a block diagram of an example network 10, in accordance with certain embodiments of the present disclosure. In certain embodiments, network 10 may be an Ethernet network. In these and other embodiments, network 10 may be an optical network. Network 10 may include one or more transmission media 12 operable to transport one or more signals communicated by components of network 10. The components of network 10, coupled together by transmission media 12, may include a plurality of network elements 102. In the illustrated network 10, each network element 102 is coupled to four other nodes to create a mesh. However, any suitable configuration of any suitable number of network elements 102 may create network 10. Although network 10 is shown as a mesh network, network 10 may also be configured as a ring network, a point-to-point network, or any other suitable network or combination of networks. Network 10 may be used in a short-haul metropolitan network, a long-haul inter-city network, or any other suitable network or combination of networks. Network 10 may represent all or a portion of a short-haul metropolitan network, a long-haul inter-city network, and/or any other suitable network or combination of networks.

Each transmission medium 12 may include any system, device, or apparatus configured to communicatively couple network devices 102 to each other and communicate information between corresponding network devices 102. For example, a transmission medium 12 may include an optical fiber, an Ethernet cable, a T1 cable, copper cable, SONET cable, a WiFi signal, a Bluetooth signal, or other suitable medium.

Network 10 may communicate information or "traffic" over transmission media 12. As used herein, "traffic" means information transmitted, stored, or sorted in network 10. Such traffic may comprise optical or electrical signals configured to encode audio, video, textual, and/or any other suitable data. The data may be real-time or non-real-time. Traffic may be communicated via any suitable communications protocol, including, without limitation, the Open Systems Interconnection (OSI) standard and Internet Protocol (IP). Additionally, the traffic communicated in network 10 may be structured in any appropriate manner including, but not limited to, being structured in frames, packets, or an unstructured bit stream. As used herein, the term "datagram" will be used to generally referred to any data structure used to convey traffic, including without limitation a packet, a frame, an unstructured bit stream, or any other suitable data structure.

Each network element 102 in network 10 may comprise any suitable system operable to transmit and receive traffic. In the illustrated embodiment, each network element 102 may be operable to transmit traffic directly to one or more other network elements 102 and receive traffic directly from the one or more other network elements 102. Network elements 102 will be discussed in more detail below with respect to FIG. 2.

Modifications, additions, or omissions may be made to network 10 without departing from the scope of the disclosure. The components and elements of network 10 described may be integrated or separated according to particular needs. Moreover, the operations of network 10 may be performed by more, fewer, or other components.

Figure 2:
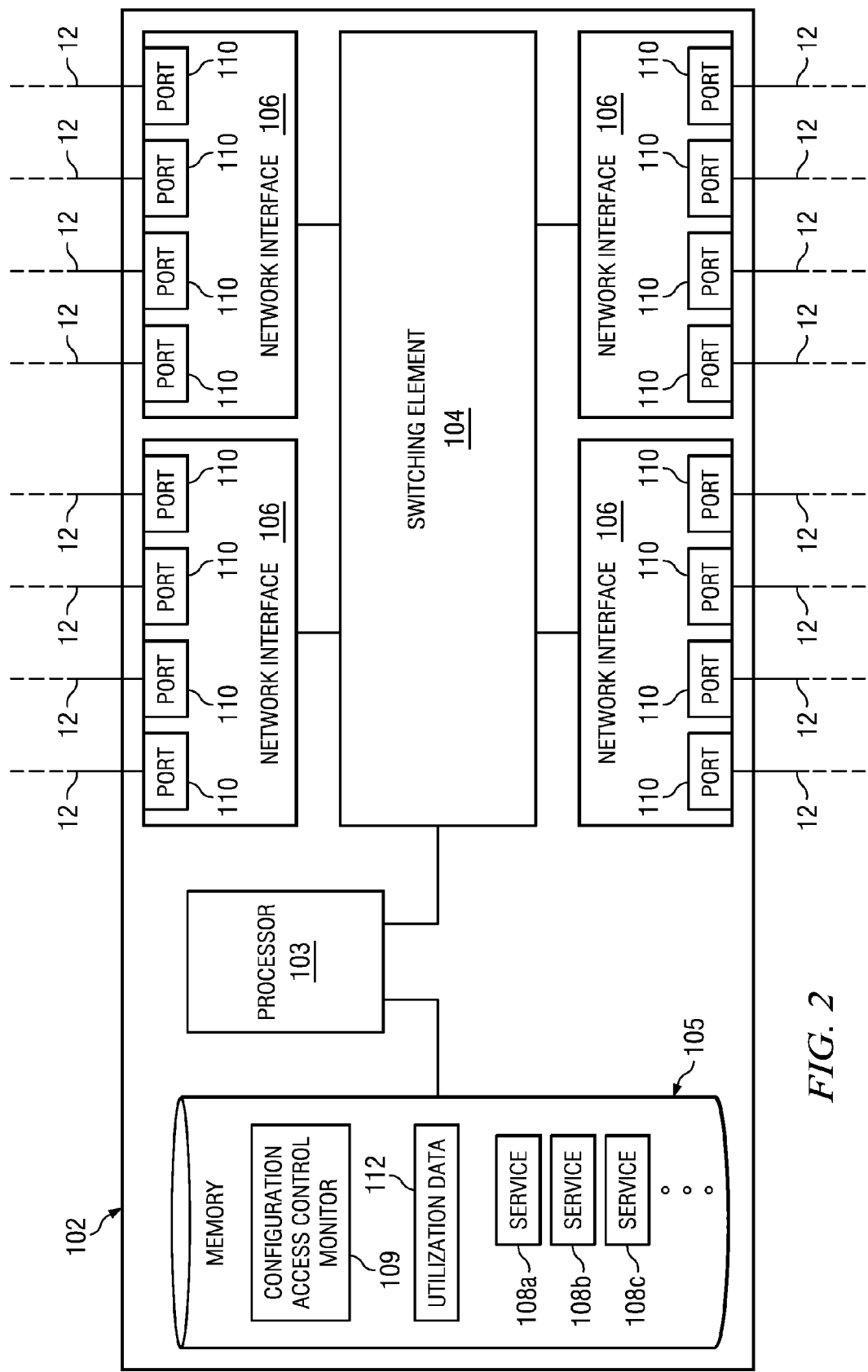
FIG. 2 illustrates a block diagram an example network element, in accordance with embodiments of the present disclosure.

FIG. 2 illustrates a block diagram an example network element 102, in accordance with certain embodiments of the present disclosure. As discussed above, each network element 102 may be coupled to one or more other network elements 102 via one or more transmission media 12. In some embodiments, however, not all network elements 102 may be directly coupled as shown in FIG. 2. Each network element 102 may generally be configured to receive data from and/or transmit data to one or more other network elements 102. In certain embodiments, network element 102 may comprise a switch or router configured to transmit data received by network element 102 to another device (e.g., another network element 102) coupled to network element 102.

As depicted in FIG. 2, network element 102 may include a processor 103, a memory 105, a switching element 104, and one or more network interfaces 106 communicatively coupled to switching element 104.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 105 and/or another component of network element 102. Although FIG. 2 depicts processor 103 as independent of other components of network element 102, in some embodiments one or more processors 103 may reside on network interfaces 106 and/or other components of network elements 102. In operation, processor 103 may process and/or interpret traffic received at a port 110. Accordingly, processor 103 may receive traffic from, or transmit traffic to ports 110 and network elements 106 via switching element 104.

Memory 105 may be communicatively coupled to processor 103 and may include any system, device, or apparatus configured to retain program instructions and/or data for a period of time (e.g., computer-readable media). Memory 105 may include random access memory (RAM), electrically erasable programmable read-only memory (EEPROM), a PCMCIA card, flash memory, magnetic storage, opto-magnetic storage, or any suitable selection and/or array of volatile or non-volatile memory that may retain data after power to network element 102 is turned off. Although FIG. 2 depicts memory 105 as independent of other components of network element 102, in some embodiments one or more memories 105 may reside on network interfaces 106 and/or other components of network element 102.

As shown in FIG. 2, memory 105 may have stored thereon one or more services 108 (e.g., services 108a, 108b, 108c), a configuration access control monitor 109, and utilization data 112. A service 108 may be configured to carry out a defined functionality or task of the network element. Examples of services 108 may include Service Operation, Administration, and Management (SOAM) Continuity Check Messaging (CCM), SOAM path monitoring (e.g., including delay measurement and fault monitoring), External Virtual Connection (EVC) path monitoring, Link Capacity Adjustment Scheme (LCAS), Management Virtual Local Area Network (MV-LAN), collection of performance measurements for network element 102, and/or execution of routing algorithms (e.g., Open Shortest Path First (OSPF) or Routing Information Protocol (RIP), and/or Ethernet Linear Protection Switching as described in ITU G.8031). In operation, a service may be read by processor 103 from memory 105 and executed by processor 103 to cause processor 103 to execute the functionality or task of the service.

Configuration access control monitor 109 may be any system, device, or apparatus configured to monitor utilization and/or processing capacity of processor 103, read utilization data 112 (e.g., pre-determined utilization data compiled during characterization of network element 102), and/or determine whether a particular configuration of instantiated services 108 is supported by the processing capacity of processor 103. For example, as described in greater detail below with reference to FIG. 4, configuration access control module 109 may read data from utilization data 112 to determine an aggregate amount of processing power that may be required to support a particular configuration of instantiated services, compare such required amount against a maximum threshold, and, based on the comparison, determine if the particular configuration may be accommodated. In some embodiments, if a particular configuration is not supported, configuration access control monitor 109 may deny instantiation of certain services (e.g., newly-instantiated services of the particular configuration). For example, in certain embodiments, if a configuration is not supported, configuration access control monitor 109 may deny instantiation of the service 108 which was most recently instantiated or attempted to be instantiated. As another example, in the same or alternative embodiments, services 108 may be ranked according to a priority, and configuration access control monitor 109 may de-instantiate or deny instantiation of a service 108 deemed to be of a low priority compared to other services 108 instantiated or desired to be instantiated.

Figures 3, 4:
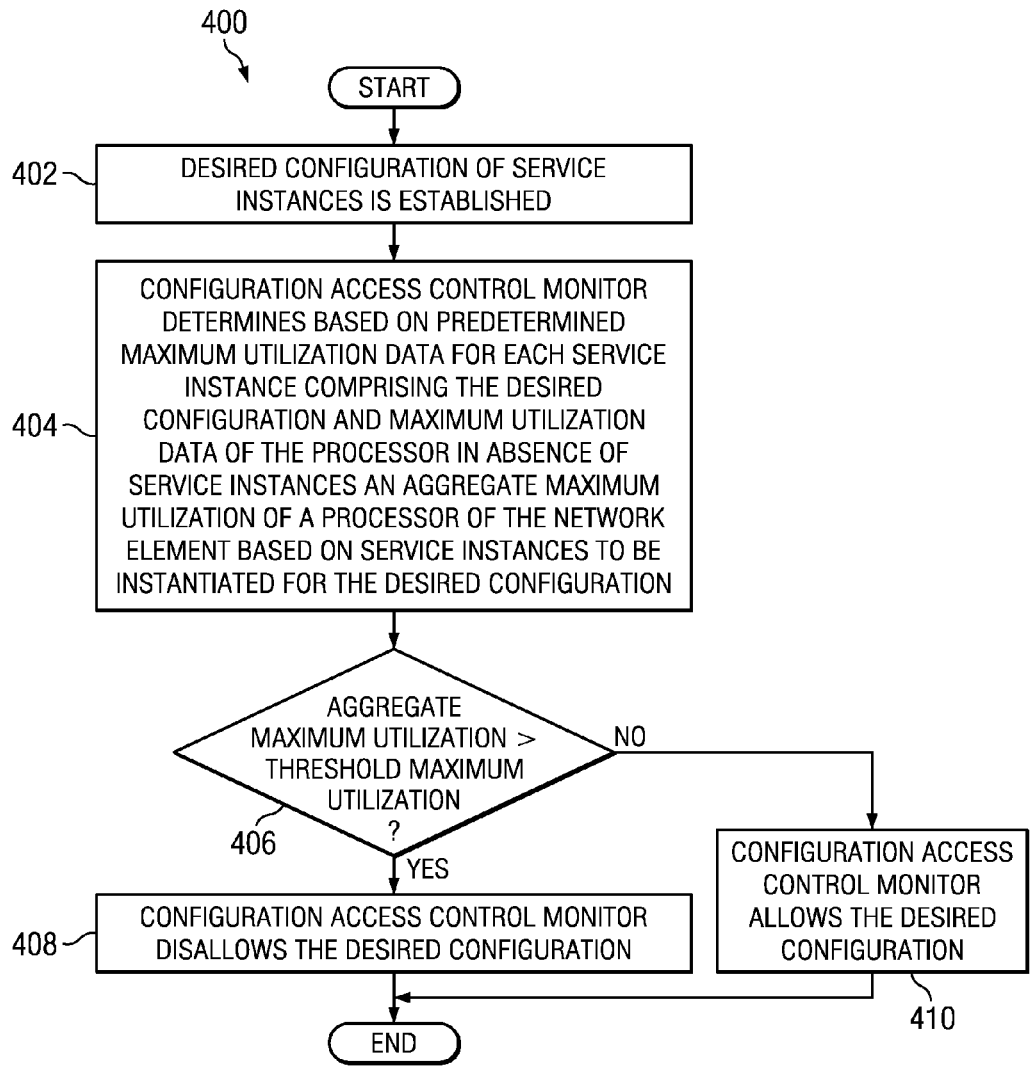
FIG. 3 illustrates example utilization data stored on a memory, in accordance with embodiments of the present disclosure.
FIG. 4 illustrates a flow chart for an example method for configuration admission control of service instances on a network element, in accordance with embodiments of the present disclosure.

Utilization data 112 may include a table, map, database, or other data structure setting forth utilization and capacity data regarding processor 103, utilization data regarding services 108, and/or other suitable data. FIG. 3 depicts an example of utilization data 112, in accordance with embodiments of the present disclosure. As shown in FIG. 3, utilization data 112 may include a plurality of entries 302, 304, and 306. An entry 302 may set forth an pre-determined maximum service-idle utilization of processor 103 when no services 108 are instantiated on network element 102. Entries 304 may set forth a pre-determined maximum utilization of processor 103 for individual instances of each service 108. An entry 306 may set forth a threshold maximum utilization of processor 103. Entries 304 setting forth pre-determined maximum utilizations of instances of services 108 may be based on characterizations of processor 103 and/or instantiations of services 108 (e.g., in a lab and/or based on simulation of execution of such service on a network element 102) to determine, for each particular service 108, a maximum utilization of processor 103 that is budgeted during execution of an instance of the particular service 108. Similarly, entry 302 setting forth pre-determined maximum service-idle utilization of processor 103 in the absence of services 108 executing on processor 103 may be based on characterizations of processor 103 (e.g., in a lab and/or based on simulation of execution of processor 103 on a network element 102) to determine a maximum utilization of processor 103 that may be used when no services 108 are instantiated. Entry 306 setting forth the threshold maximum utilization of processor 103 may represent a desired maximum utilization of processor 103, and may be set manually by an administrator of a network element 102, a manufacturer of network element 102, or automatically based on characteristics of network element 102 and/or its various components. The threshold maximum utilization may range from zero to the actual physical maximum utilization of the processor.

Thus, in accordance with embodiments of the present disclosure, configuration access control monitor 109 may, for a particular configuration of instances of services 108, determine an aggregate maximum utilization of processor 103 for the configuration based on entries 302 and 304 and compare such aggregate maximum utilization with the threshold maximum utilization of processor 103 (entry 306), to determine if the configuration is supported. For example, as a new service is configured, and/or instantiated the aggregate of entry 302 and sum of entries 304 may be compared to entry 306, and if the aggregate of entries 302 and 304 than 306, the most recently configured service(s) or the lowest priority service(s), may be denied and/or deprovisioned.

Returning to FIG. 2 switching element 104 may include any suitable system, apparatus, or device configured to receive traffic via a port 110 and forward such traffic to a particular network interface 106 and/or port 110 based on analyzing the contents of the datagrams carrying the traffic and/or based on a characteristic of a signal carrying the datagrams (e.g., a wavelength and/or modulation of the signal). For example, in certain embodiments, a switching element 104 may include a switch fabric (SWF).

Each network interface 106 may be communicatively coupled to switching element 104 and may include any suitable system, apparatus, or device configured to serve as an interface between a network element 102 and a transmission medium 12. Each network interface 106 may enable its associated network element 102 to communicate to other network elements 102 using any suitable transmission protocol and/or standard. Network interface 106 and its various components may be implemented using hardware, software, or any combination thereof. For example, in certain embodiments, one or more network interfaces 106 may include a network interface card. In the same or alternative embodiments, one or more network interfaces 106 may include a line card.

As depicted in FIG. 2, each of network interfaces 106 may include one or more physical ports 110. Each physical port 110 may include any system, device or apparatus configured to serve as a physical interface between a corresponding transmission medium 12 and network interface 106. For example, a physical port 110 may comprise an Ethernet port, an optical port, or any other suitable port.

FIG. 4 illustrates a flow chart for an example method 400 for configuration admission control of service instances on a network element, in accordance with embodiments of the present disclosure. According to some embodiments, method 400 may begin at step 402. As noted above, teachings of the present disclosure may be implemented in a variety of configurations of network 10 and/or network element 102. As such, the preferred initialization point for method 400 and the order of the steps 402-410 comprising method 400 may depend on the implementation chosen.

At step 402, a desired configuration of service instances may be established (e.g., instances of services 108 may be established for a network element (e.g., network element 102). In some embodiments, such desired configuration may be established manually by an administrator. For example, an administrator may establish a desired configuration by manifesting a desire (e.g., by one or more commands via a user interface of the network element) to add an additional service instance to an existing service instance configuration for the network element. As another example, an administrator may establish a desired configuration by manifesting a desire (e.g., by one or more commands via a user interface of the network element) to have the network element operate with a particular configuration of service instances. In other embodiments, a desired configuration may be established automatically by the network element (e.g., in response to occurrence of an appropriate triggering event).

At step 404, in response to establishment of a desired configuration, a configuration access control monitor (e.g., configuration access control monitor 109) or other suitable component of the network element may determine, based on pre-determined maximum utilization data for each service instance comprising the desired configuration and maximum utilization data of the processor in the absence of service instances, an aggregate maximum utilization of a processor of the network element based on service instances to be instantiated for the desired configuration. For example, the aggregate maximum utilization may be calculated by adding a pre-determined maximum service-idle utilization of the processor in the absence of instantiated services and a pre-determined maximum utilization of the processor for each instance of each service to be instantiated in the desired configuration. In embodiments in which the desired configuration is the addition of one service instance to an existing configuration, the aggregate maximum utilization for the desired configuration may be calculated by adding the aggregate maximum utilization of the existing configuration to a pre-determined maximum utilization of the processor for the service instance to be added. In these and other embodiments, the aggregate maximum utilization may be determined by reference to pre-determined utilizations for the processor and the services set forth in a utilization data file (e.g., utilization data 112) or other file.

At step 406, the configuration access control monitor or other suitable component of the network element may compare the aggregate maximum utilization of the processor for the desired configuration to a threshold maximum utilization. If the aggregate maximum utilization exceeds the threshold maximum utilization, method 400 may proceed to step 408. Otherwise, if the aggregate maximum utilization does not exceed the threshold maximum utilization, method 400 may proceed to step 410.

At step 408, in response to a determination that the aggregate maximum utilization exceeds the threshold maximum utilization, the configuration access control monitor or other suitable component of the network element may disallow the desired configuration. In embodiments in which the desired configuration is the addition of one service instance to an existing configuration, disallowance of the desired configuration may comprise denying execution of the additional service instance while maintaining the existing configuration. Alternatively, in such embodiments, disallowance may comprise allowing execution of the additional service instance and terminating one or more service instances of the existing configuration that have a lower priority than the additional service instance. After completion of step 408, method 400 may end. In some embodiments, after completion of step 408, method 400 may return to step 402.

At step 410, in response to a determination that the aggregate maximum utilization does not exceed the threshold maximum utilization, the configuration access control monitor or other suitable component of the network element may allow the desired configuration. In embodiments in which the desired configuration is the addition of one service instance to an existing configuration, allowance of the desired configuration may comprise allowing execution of the additional service instance. After completion of step 410, method 400 may end. In some embodiments, after completion of step 410, method 400 may return to step 402.

Although FIG. 4 discloses a particular number of steps to be taken with respect to method 400, method 400 may be executed with greater or lesser steps than those depicted in FIG. 4. In addition, although FIG. 4 discloses a certain order of steps to be taken with respect to method 400, the steps comprising method 400 may be completed in any suitable order.

Method 400 may be implemented using network element 102 or any other system operable to implement method 400. In certain embodiments, method 400 may be implemented partially or fully in software and/or firmware embodied in a memory or other computer-readable media (e.g., memory 105) and executable by a processor or other suitable device (e.g. processor 103).

A component of network 10 and/or a network element 102 may include an interface, logic, memory, and/or other suitable element. An interface receives input, sends output, processes the input and/or output, and/or performs other suitable operations. An interface may comprise hardware and/or software.

Logic performs the operations of the component, for example, executes instructions to generate output from input. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to network 10 and/or a network element 102 without departing from the scope of the invention. The components of network 10 and/or network element 102 may be integrated or separated. Moreover, the operations of network 10 and/or network element 102 may be performed by more, fewer, or other components. Additionally, operations of network 10 and/or a network element 102 may be performed using any suitable logic. As used in this document, "each" refers to each member of a set or each member of a subset of a set.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method for configuring admission control of service instances in a network element, comprising:
  reading a pre-determined maximum service-idle utilization of a processor approximately equal to maximum utilization of the processor in the absence of services executing on the processor;
  reading, for each particular service instance of a desired configuration of service instances, a pre-determined maximum utilization of the processor associated with the particular service instance;
  calculating an aggregate maximum utilization for the desired configuration, based on the pre-determined maximum service-idle utilization and the pre-determined maximum utilizations for each of the particular service instances;
  determining whether the aggregate maximum utilization is greater than a threshold maximum utilization for the processor;
  allowing the desired configuration if the aggregate maximum utilization is not greater than the threshold maximum utilization for the processor; and
  denying the desired configuration if the aggregate maximum utilization is greater than the threshold maximum utilization for the processor.

2. A method in accordance with claim 1, wherein the desired configuration is the addition of one service instance to an existing configuration.

3. A method in accordance with claim 2, wherein calculating the aggregate maximum utilization for the desired configuration comprises adding the aggregate maximum utilization of the existing configuration to the pre-determined maximum utilization for the service instance to be added.

4. A method in accordance with claim 2, wherein denying the desired configuration comprises:
denying execution of the service instance to be added; and
maintaining the existing configuration.

5. A method in accordance with claim 2, wherein denying the desired configuration comprises:
allowing execution of the service instance to be added; and
terminating one or more service instances of the existing configuration that have a lower priority than the service instance to be added.

6. A method in accordance with claim 2, wherein allowing the desired configuration comprises allowing execution of the service instance to be added.

7. A network element comprising:
a processor; and
a memory having embodied thereon:
one or more services, each of the one or more services comprising instructions configured to, when read and executed by the processor, perform a specific task;
utilization data, the utilization data comprising:
a pre-determined maximum service-idle utilization of the processor approximately equal to maximum utilization of the processor in the absence of any of the one or more services executing on the processor; and
for each of the one or more particular services, a pre-determined maximum utilization of the processor associated with an instance of the particular service;
a configuration access control monitor comprising instructions configured to, when read and executed by the processor:
read the pre-determined maximum service-idle utilization;
read, for each particular service instance of a desired configuration of the one or more services, the pre-determined maximum utilization of the processor associated with the particular service instance;
calculate an aggregate maximum utilization for the desired configuration, based on the pre-determined maximum service-idle utilization and the pre-determined maximum utilizations for each of the particular service instances;
determine whether the aggregate maximum utilization is greater than a threshold maximum utilization for the processor;
allow the desired configuration if the aggregate maximum utilization is not greater than the threshold maximum utilization for the processor; and
deny the desired configuration if the aggregate maximum utilization is greater than the threshold maximum utilization for the processor.

8. A network element in accordance with claim 7, wherein the desired configuration is the addition of one service instance to an existing configuration.

9. A network element in accordance with claim 8, the configuration access control monitor further configured to calculate the aggregate maximum utilization for the desired configuration by adding the aggregate maximum utilization of the existing configuration to the pre-determined maximum utilization for the service instance to be added.

10. A network element in accordance with claim 8, the configuration access control monitor further configured to deny the desired configuration by:
denying execution of the service instance to be added; and
maintaining the existing configuration.

11. A network element in accordance with claim 8, the configuration access control monitor further configured to deny the desired configuration by:
allowing execution of the service instance to be added; and
terminating one or more service instances of the existing configuration that have a lower priority than the service instance to be added.

12. A network element in accordance with claim 8, the configuration access control monitor further configured to allow the desired configuration by allowing execution of the service instance to be added.

13. A non-transitory computer-readable medium comprising logic for configuring admission control of service instances in a network element, the logic, when executed, configured to:
read a pre-determined maximum service-idle utilization of a processor approximately equal to maximum utilization of the processor in the absence of services executing on the processor;
read, for each particular service instance of a desired configuration of service instances, a pre-determined maximum utilization of the processor associated with the particular service instance;
calculate an aggregate maximum utilization for the desired configuration, based on the pre-determined maximum service-idle utilization and the pre-determined maximum utilizations for each of the particular service instances;
determine whether the aggregate maximum utilization is greater than a threshold maximum utilization for the processor;
allow the desired configuration if the aggregate maximum utilization is not greater than the threshold maximum utilization for the processor; and
deny the desired configuration if the aggregate maximum utilization is greater than the threshold maximum utilization for the processor.

14. A non-transitory computer-readable medium in accordance with claim 13, wherein the desired configuration is the addition of one service instance to an existing configuration.

15. A non-transitory computer-readable medium in accordance with claim 14, wherein calculating the aggregate maximum utilization for the desired configuration comprises adding the aggregate maximum utilization of the existing configuration to the pre-determined maximum utilization for the service instance to be added.

16. A non-transitory computer-readable medium in accordance with claim 14, wherein denying the desired configuration comprises:
denying execution of the service instance to be added; and
maintaining the existing configuration.

17. A non-transitory computer-readable medium in accordance with claim 14, wherein denying the desired configuration comprises:
allowing execution of the service instance to be added; and
terminating one or more service instances of the existing configuration that have a lower priority than the service instance to be added.

18. A non-transitory computer-readable medium in accordance with claim 14, wherein allowing the desired configuration comprises allowing execution of the service instance to be added.

* * * * *